UNITED STATES PATENT OFFICE.

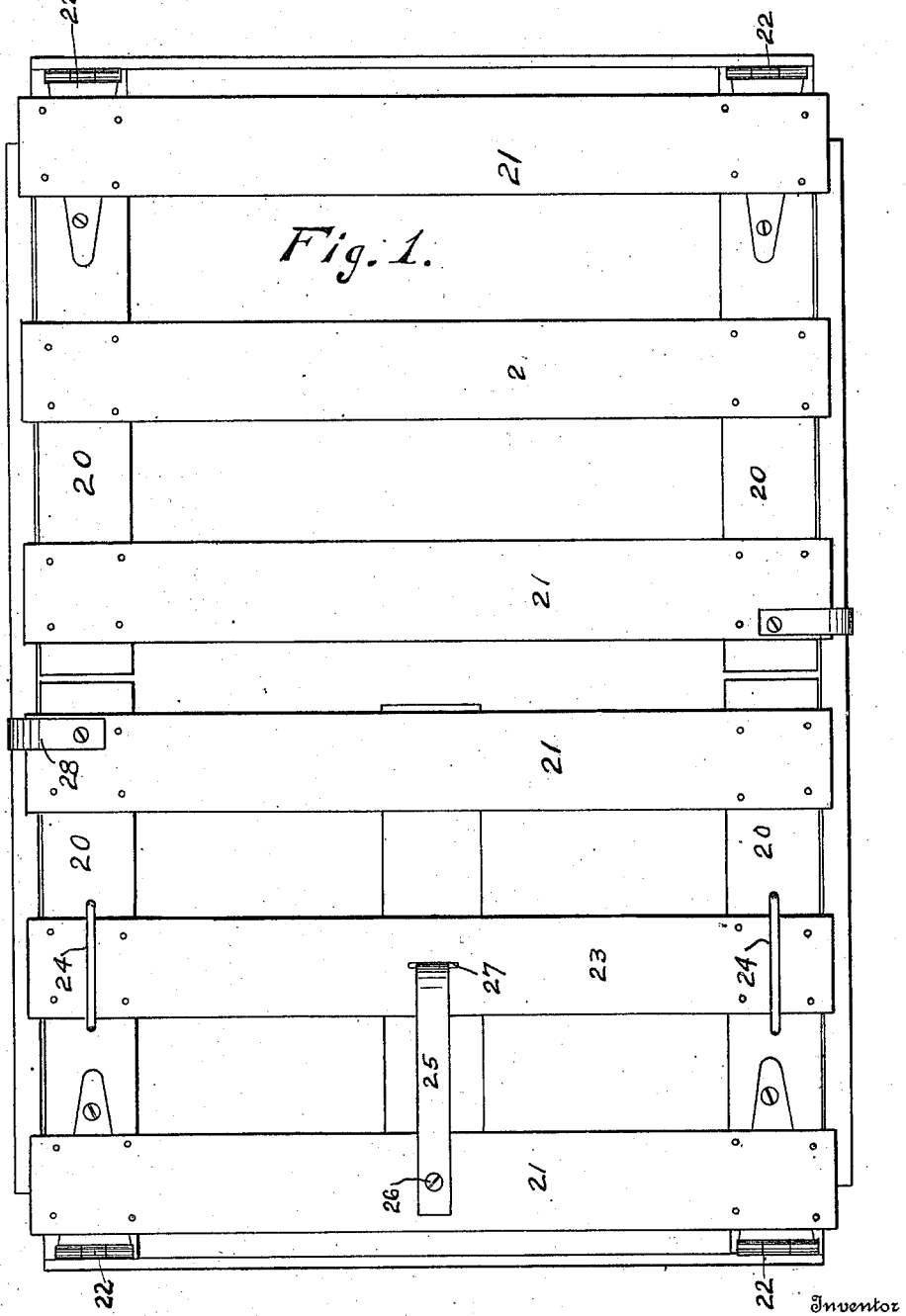

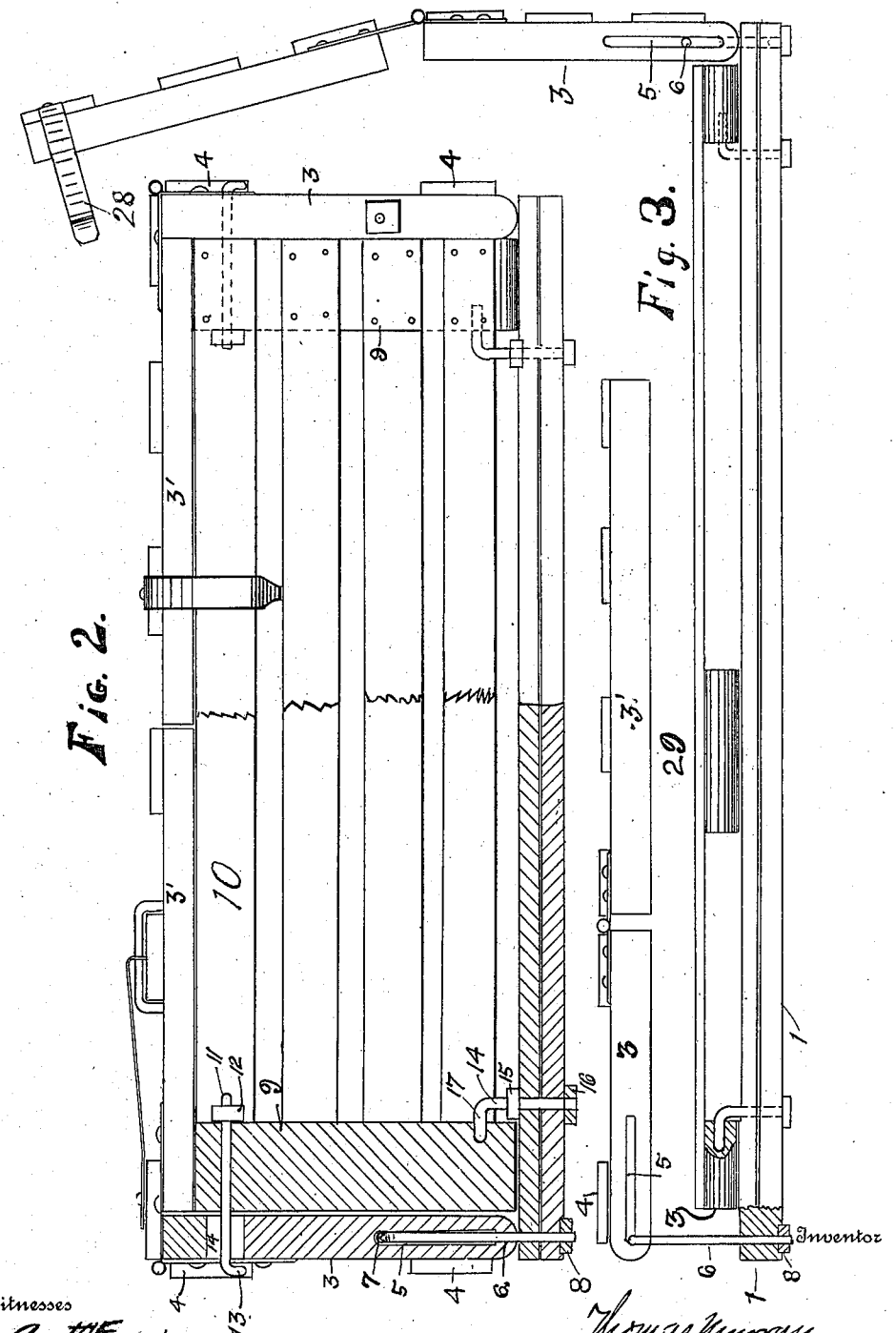

THOMAS MURRAY, OF WATERLOO, WISCONSIN.

FOLDING POULTRY-CRATE.

963,798.  Specification of Letters Patent.  Patented July 12, 1910.

Application filed June 26, 1909. Serial No. 504,410.

*To all whom it may concern:*

Be it known that I, THOMAS MURRAY, a citizen of the United States, residing at Waterloo, county of Jefferson, and State of Wisconsin, have invented new and useful Improvements in Folding Poultry-Crates, of which the following is a specification.

My invention relates to improvements in collapsible poultry crates, and it pertains more especially, among other things, to the device for foldably connecting the side and end members with the bottom of the crate and the top to the end and side members of the crate, and the same is explained by reference to the accompanying drawings, in which—

Figure 1 represents a plan view thereof. Fig. 2 is a side view, part broken away and other parts in section, of the crate set up in position for use, and Fig. 3 also represents a side view of the crate, partially folded together.

Like parts are identified by the same reference numerals throughout the several views.

1 is the bottom of the crate, which corresponds in width and length to the width and length of the top and sides of the crate, shown in Fig. 2. The end members of the crate each comprise two vertical corner posts 3 and two horizontally arranged end members 4, 4, which connect the two end posts together. The inner opposing sides of the respective posts 3 are provided with vertical slots 5 for the reception of the hinge bolts 6. The hinge bolts 6 are respectively provided at their upper ends with angular bends 7 extending horizontally within said slots 5 and serve to hold said end members in connection with the base member 1. The object of the longitudinal slots 5 is to permit the posts of the end members to be respectively raised from the position shown in Fig. 2 to that shown in Fig. 3, preparatory to folding the end members 3 over and upon the respective side members, as shown in said Fig. 3. The lower ends of the hinge bolts 6 extend downwardly through the bottom 1 of the crate and are provided with retaining nuts 8.

The posts of one of the end members and a portion of the farther side member are shown in vertical section at the left in Fig. 2. When the crate is set up in position for use, the respective posts of the end members are secured to the respective posts 9 of the side members 10 by the hinge bolts 11 and nuts 12. The hinge bolts 11 are provided with angular bends 13, which are adapted to be inserted through the apertures 14 of the respective posts 3, when they are turned horizontally so as to engage the exterior surfaces of the posts, whereby such parts are securely retained together in position for use. The lower sides of the side members 10 are secured at their respective ends to the bottom 1 by the hinge bolts 14, said hinge bolts 14 being secured in apertures provided therefor in the bottom 1, by and between the nuts 15 and 16, and the angular bends 17 of said hinge bolts extend horizontally into apertures provided therefor in the respective end posts 9 of the side members. It will be understood that both end members and both ends of the side members are connected together and with the bottom of the crate in like manner, substantially as more fully indicated on the left hand side of Fig. 2.

The top member is formed in two foldable parts 3', respectively comprising the longitudinal members 20, 20 and the transversely arranged members 21, 21, and such foldable parts are connected with the respective end posts of the end members by two sets of hinges 22, 22, whereby either one or both of said top members may be opened independently of the other. One of the top members is preferably provided with a central slidable member 23, which is secured to the longitudinal members 20 by the metallic keepers 24, 24, and said slidable member is prevented from moving longitudinally in the keepers 24 by the spring pawl 25. The spring pawl 25 is rigidly connected at one end to one of the transverse members 21, by the screw 26, while its opposite end is adapted to engage in the slot 27 of said slidable member, whereby said slidable member is prevented from accidentally moving in its bearings. When, however, it is desirous to remove the poultry from the crate, the spring pawl 25 is raised, so as to be disengaged from the slot 27, when the slidable member 23 may be moved in its bearings so as to provide the necessary opening for reaching the poultry. The folding top members are each provided with spring catches 28, 28, which extend downwardly past the side members and are adapted to engage beneath the lower edge of the upper side member, whereby said folding top members are securely retained in their closed position.

When it is desired to fold the crate for shipping, the two side members are first turned from the vertical position shown in Fig. 2 over and upon the bottom member, as shown in Fig. 3, when the end and top members are drawn upwardly in a vertical position as indicated on the right in Fig. 3. When this is done, the end and top members are folded one upon the other, above the side members, and when thus folded, the vertical part shown upon the right in Fig. 1, will be located in the space 29 between the side members and the parts 3 and 3' above, when the crate is in condition for storing or reshipping.

Having thus described my invention, what I claim as new, and desire to secure by Letters Patent, is—

In a crate of the described class, the device for foldably connecting the respective vertical end members to the bottom horizontal member so that said end members may be raised and folded over and upon the sides of the folded side members, consisting in the combination with the respective corners of the bottom member, of an angular hinge bolt rigidly affixed at one end to said bottom member and having its angular bend slidably connected with the vertical posts of said end members, said vertical posts being provided with longitudinal slots for the reception of the angular bends of said hinge bolts, whereby they are adapted to be raised preparatory to being folded over upon the folded side members.

In testimony whereof I affix my signature in the presence of two witnesses.

THOMAS MURRAY.

Witnesses:
E. E. BROSSARD,
DORA E. EDWARDS.